C. A. BROSTROM.
PLOW.
APPLICATION FILED JUNE 21, 1912.
1,062,141.
Patented May 20, 1913.
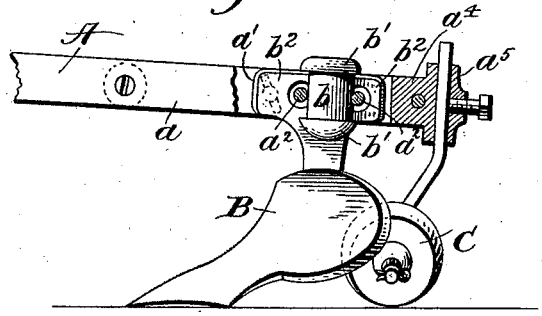
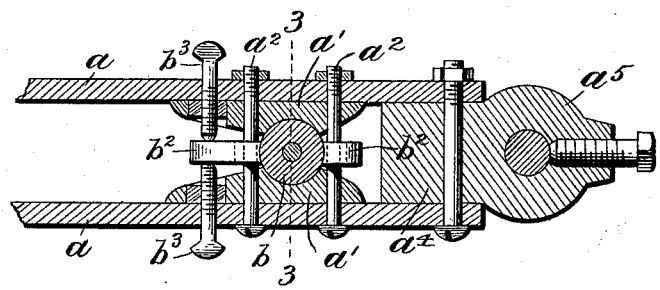
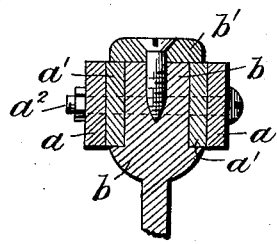
Inventor:
Carl A. Brostrom,
By Bollinger & Block Attorneys
Witnesses:
Jas. E. Hutchinson
G. Wedemeier

UNITED STATES PATENT OFFICE.

CARL A. BROSTROM, OF MOLINE, ILLINOIS.

PLOW.

1,062,141. Specification of Letters Patent. Patented May 20, 1913.

Original application filed November 16, 1911, Serial No. 660,570. Divided and this application filed June 21, 1912. Serial No. 705,043.

*To all whom it may concern:*

Be it known that I, CARL A. BROSTROM, a citizen of the United States, residing at Moline, in the county of Rock Island and State of Illinois, have invented certain new and useful Improvements in Plows, of which the following is a specification.

This invention relates to an improvement in plows and more especially gang plows, and is a division of my application, filed November 16, 1911, Serial Number 660,570.

The present invention relates more particularly to an improved means of securing a plow standard to the plow beam, one of the objects of the invention being to provide improved securing means of this character, whereby the plow standard can be adjusted to any desired angle relative to the beam.

A further object of the present invention is the provision of means for adjustably connecting the plow standard to the beam of such a construction that the plow standard will be securely held against displacement in any position to which it may be adjusted.

Other objects of the invention will be apparent from the detailed description hereinafter when read in connection with the accompanying drawings forming a part hereof, wherein a convenient embodiment of the invention is illustrated, and wherein like characters of reference refer to similar parts in the several views.

In the drawings: Figure 1 is a side elevation of a plow beam and plow, constructed in accordance with the present invention; Fig. 2 is a horizontal section on line 2—2 of Fig. 1, and Fig. 3 is a cross section on line 3—3 of Fig. 1.

Referring now more particularly to the drawings, A designates a plow beam which is provided with a suitable plow B rigidly supported adjacent the rear end thereof and with a supporting roller C which is positioned in rear of the plow B and is conveniently secured to the plow beam in such a manner that it can be adjusted vertically. The plow beam is adapted to be connected at its forward end in any suitable manner to the main frame of the plow, but as this construction forms no part of the present invention, I have deemed it unnecessary to illustrate the same.

In the embodiment of the invention illustrated in the accompanying drawings, the plow beam is shown as being formed of two metallic bars $a$ which are rigidly secured together in any suitable manner in spaced relation, the standard of the plow B being supported between the bars $a$ of the beam adjacent the rear end thereof. The present invention contemplates the mounting of the standard of the plow B in the beam in such a manner that the plow may be angularly adjusted when it is found desirable to do so. To this end, a pair of separated blocks $a'$ $a'$ are positioned between the metallic bars $a$, forming the beam, the adjacent faces of which blocks are provided with curved seats therein which are adapted to embrace a cylindrical portion $b$ formed adjacent the upper end of the plow standard. The blocks $a'$ are retained in position by means of securing bolts $a^2$ which pass through such blocks and the metallic bars $a$ of the plow beam, two of such bolts being preferably utilized which are positioned one upon each side of the bearing portions provided in the blocks $a'$. The cylindrical portion $b$ of the plow standard is provided with enlarged portions or collars $b'$ and $b'$ which are adapted to overlie the upper and lower surfaces of the blocks $a'$ $a'$ and thus prevent any vertical movement of the standard between such blocks.

When the securing bolts $a^2$ are tightened the flexibility of the metallic bars $a$ of the beam enables said blocks to be forced tightly into engagement with the cylindrical portion $b$ of the plow standard. To prevent any acidental movement of the plow standard between the blocks $a'$, said standard is provided with a portion $b^2$ which extends forwardly and rearwardly from the cylindrical portion $b$ of the standard and is positioned between the bearing blocks $a'$. Threaded in the bars $a$ of the beam A and passing through portions of the bearing blocks $a'$ are set screws $b^3$, the inner ends of which are adapted to contact with the opposite surfaces of the portion of the member $b^2$ which extend forwardly from the plow standard. From this construction it will be seen that by means of the set screws $b^3$, the plow standard may be shifted between the bearing blocks $a'$ to any desired extent, and securely locked in this shifted position. The portions $b^2$ which project from the plow standard are provided with suitable slots therein permitting the passage therethrough of the clamping bolts $a^2$.

Secured within the rear ends of the bars $a$ of the beam A is a block $a^4$ which carries a vertically disposed sleeve $a^5$ in which is adjustably secured by a set screw or other suitable means, the standard which carries the roller C.

From the construction hereinbefore described, it will be seen that the plow may be set at any desired angle relative to the beam and that it will be securely and rigidly held in any position to which it may be adjusted. This construction is also of importance as it enables the plow to be adjusted so that it will run in a straight line even if the beam should be bent to a slight extent.

While a convenient embodiment of the invention is illustrated in the accompanying drawings, it will be understood that many changes may be made to the particular form and construction therein shown without departing from the spirit and scope of the invention as defined in the appended claims.

I claim:—

1. In a plow, a beam comprising a pair of connected spaced bars, a pair of blocks positioned between said bars and provided with curved portions in the adjacent faces thereof, a standard provided with a cylindrical shaped portion fitting between the curved portions of said blocks, said standard being provided with a projection extending laterally therefrom and positioned between the spaced bars of the plow beam, means carried by the beam and adjustably engaging said portion to adjust the standard relative to said beam, and clamping bolts passing between the bars of the beam and the interposed block.

2. In a plow, a plow beam comprising a pair of spaced bars, blocks positioned between the bars of said beam and provided with curved portions in the adjacent faces thereof, a standard provided with a cylindrical portion fitting between the curved portions of said blocks, said standard being provided with a projection extending therefrom, and set screws threaded in the bars of said beam and engaging opposite sides of the projection extending from said standard.

3. In a plow, a beam comprising a pair of connected spaced bars, a pair of blocks positioned between said bars and provided with curved portions in the adjacent faces thereof, a standard provided with a cylindrical shaped portion fitting between the curved portions of said blocks, having collars positioned above and below said blocks and with a projection extending laterally therefrom, means carried by the beam and adjustably engaging said projection to adjust the standard in the beam, and clamping bolts connecting the spaced bars of the beam.

In testimony whereof I affix my signature in presence of two witnesses.

CARL A. BROSTROM.

Witnesses:
J. A. NELSON,
LOUIS BLOCK.

Copies of this patent may be obtained for five cents each, by addressing the "Commissioner of Patents, Washington, D. C."